United States Patent
Hanna

[11] Patent Number: 6,154,331
[45] Date of Patent: Nov. 28, 2000

[54] DISK FORMATTER WRITE GATE LOOK-AHEAD DEVICE

[75] Inventor: Stephen D. Hanna, Fort Collins, Colo.

[73] Assignee: LSI Logic Corporation, Milpitas, Calif.

[21] Appl. No.: 09/216,636

[22] Filed: Dec. 18, 1998

Related U.S. Application Data

[63] Continuation-in-part of application No. 09/164,849, Oct. 1, 1998, which is a continuation-in-part of application No. 08/722,729, Oct. 1, 1996, abandoned.

[51] Int. Cl.$^7$ ...................................................... G11B 5/09
[52] U.S. Cl. ................................ 360/51; 360/61; 360/68; 360/77.08; 360/46
[58] Field of Search .................................. 360/61, 51, 68, 360/46, 67, 66, 60

[56] References Cited

U.S. PATENT DOCUMENTS

| | | | |
|---|---|---|---|
| 4,924,331 | 5/1990 | Robinson et al. | 360/72.1 |
| 4,972,316 | 11/1990 | Dixon et al. | 364/200 |
| 4,999,720 | 3/1991 | Wilson et al. | 360/48 |
| 5,255,136 | 10/1993 | Machado et al. | 360/77.02 |
| 5,271,018 | 12/1993 | Chan | 371/10.2 |
| 5,274,509 | 12/1993 | Buch | 360/48 |
| 5,305,302 | 4/1994 | Hardwick | 369/275.3 |
| 5,386,402 | 1/1995 | Iwata | 369/32 |
| 5,418,659 | 5/1995 | Shergill | 360/51 |
| 5,438,559 | 8/1995 | Best et al. | 369/54 |
| 5,455,721 | 10/1995 | Nemazie et al. | 360/51 |
| 5,475,540 | 12/1995 | Gold | 360/48 |
| 5,477,103 | 12/1995 | Romano et al. | |
| 5,517,631 | 5/1996 | Machado et al. | 360/77.08 X |
| 5,523,903 | 6/1996 | Hetzler et al. | 360/77.08 |
| 5,561,566 | 10/1996 | Kigami et al. | 360/48 |
| 5,581,418 | 12/1996 | Hasebe | 360/51 |
| 5,627,695 | 5/1997 | Prins et al. | 360/51 |
| 5,640,538 | 6/1997 | Dyer et al. | 395/500 |
| 5,684,972 | 11/1997 | Hill et al. | 395/404 |
| 5,715,106 | 2/1998 | Kool et al. | 360/48 |
| 5,818,654 | 10/1998 | Reddy et al. | 360/53 |

FOREIGN PATENT DOCUMENTS

| | | | |
|---|---|---|---|
| 440413A | 8/1991 | European Pat. Off. | G11B 27/10 |
| 0631277 | 6/1994 | European Pat. Off. | G11B 5/596 |
| 0660324 | 12/1994 | European Pat. Off. | G11B 20/12 |
| 9524035 | 9/1995 | WIPO | G11B 20/12 |

*Primary Examiner*—Paul Loomis
*Assistant Examiner*—K. Wong

[57] ABSTRACT

A device to turn on a disk formatter's write gate and NRZ line drivers with minimal delay from a sector pulse. The device utilizes a look-ahead scheme to asynchronously qualify a sector pulse to drive the write gate and enable the NRZ output drivers. The write gate and NRZ line drivers are conditionally enabled by a sector pulse and are held in the enabled state until the disk formatter provides an enable signal. The enabled NRZ line drivers provide binary zeros until actual data is provided to the drivers.

20 Claims, 4 Drawing Sheets

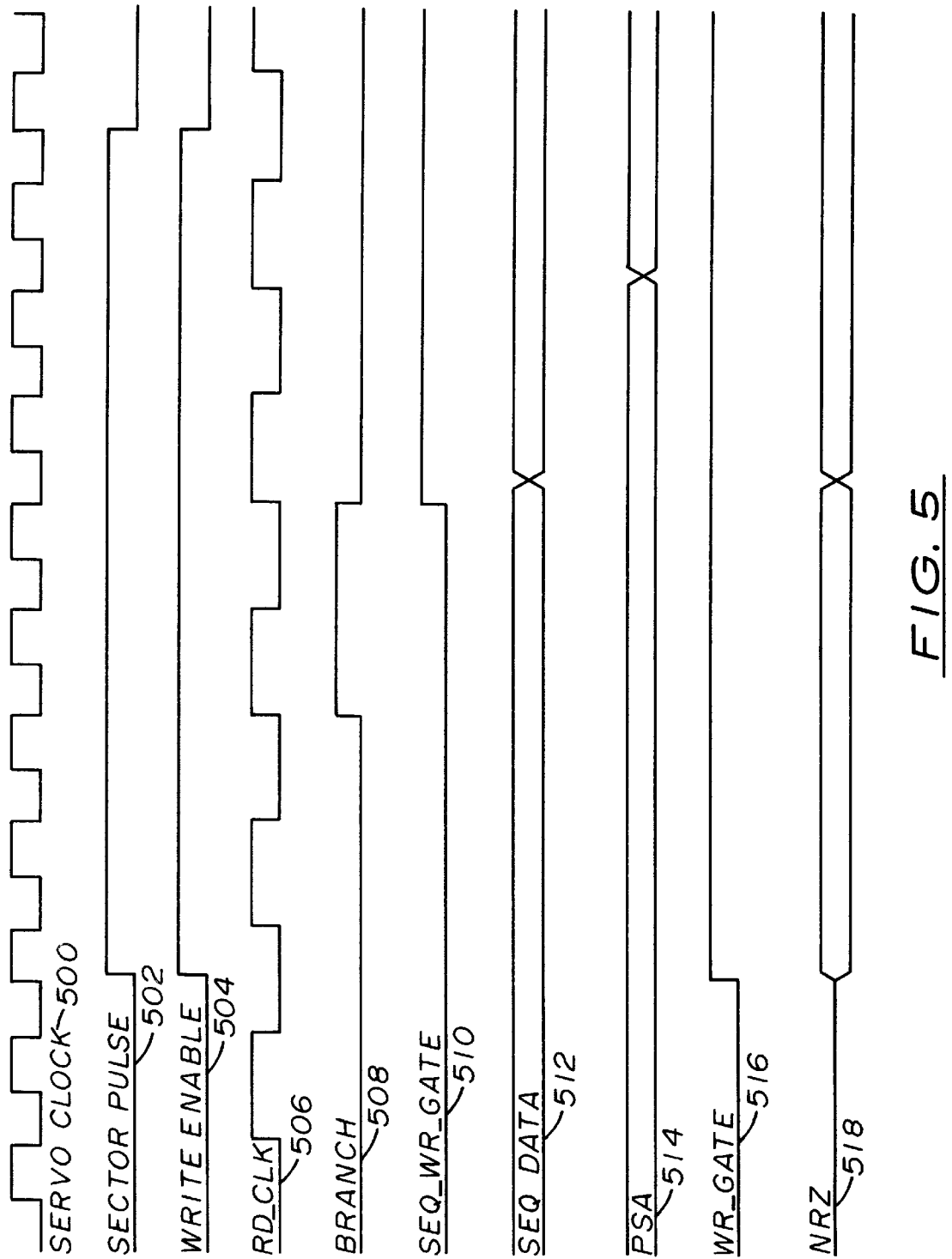

DISK FORMATTER WRITE GATE LOOK-AHEAD DEVICE

This is a continuation in part of application Ser. No. 09/164,849 filed Oct. 1, 1998, "Headerless Formatted Disk Drive" patent pending, which is a continuation in part of application Ser. No. 08/722,729 filed Oct. 1, 1996, "Headerless Formatted Disk Drive" now abandoned.

BACKGROUND OF THE INVENTION

A. Field of the Invention

The present invention relates to computer disk drives and more particularly to headerless-formatted data storage on a platter of a disk drive.

B. Background of the Invention

A typical computer disk drive media platter used for data storage is shown in FIG. 1. Platter 100 contains embedded servo fields S1–S4 that extend radially from aperture 102. In a typical disk, there may be 60–80 servo fields, or more. The servos do not have to be aligned. Platter 100 also includes annular zones Z1 and Z2. Zone Z1 is defined by aperture 102 and circumference 104. Zone Z2 is defined by circumferences 104 and 106. In a typical disk there may be many more zones. Typically, each zone contains multiple tracks, and each track is divided into multiple sectors. As shown in FIG. 1, zone Z1 and Z2 each include one track. The track of zone Z1 is divided into sectors 1–6. The track of zone Z2 is divided into sectors 1–11.

Servo fields S1–S4 are used to position the heads of the disk drive for read/write operations. The servo fields can contain data such as the specific servo field, the cylinder, and the track of the platter. Data are stored on platter 100 between servo fields S1–S4 in the various sectors. Occasionally a sector on platter 100 will be divided into one or more sector fragments by a servo field.

The data is recorded in a density defined as bits-per-inch (BPI). The BPI remains generally uniform over the entire area of platter 100. Tracks located radially farther from aperture 110 than other tracks will have a greater length. For example, the track of Zone Z2 has a larger radius as the track of Zone Z1 and therefore the track of Zone Z1 will have a greater length. Consequently, the track of Zone Z2 will be able to store more data than the track of Zone Z1.

As the platter 100 rotates, clock pulses are provided to a disk controller by the read/write channel. The clock pulses generated by the disk controller clock are synchronized to the various fields on the platter 100. A servo pulse is typically generated during or at the end of a servo field. A sector pulse is generated at the beginning of each sector. An index pulse is generated once every platter revolution to coincide with the index field on the platter indicated by I in zones Z1 and Z2.

Each sector is identified by a physical sector address (PSA). Some disk drive systems store identification data within a header portion of each sector. This is referred to as a headered format. Other methods of data storage provide a headerless system, where the sector identification and format characteristics are stored in memory, rather than on the disk. This is referred to as a headerless format. FIG. 2 depicts a headerless sector divided into various fields.

The headerless format reduces the amount of overhead within each sector. That is, ID header fields, header CRC fields and the like, which decrease the amount of platter space available for data storage, are omitted. In its place, the headerless disk controller determines sector locations based on the servo fields, as shown in FIG. 1, in combination with address information stored in memory. The radially extending servo fields S1, S2, S3, S4 are equally spaced around the circumference of the disk 100. Even though the width between the servo fields increases as one proceeds from the inner most servo sector to an outermost servo sector, the time between the occurrence of each servo remains constant. That is, servos occur at regular intervals regardless of the radial distance at which the read head detects them. In addition, the number of servo sectors per track remains constant irrespective of the data track.

Typically, the headerless sector fields include a pad 202, which is a buffer zone that is written to the disk to ensure the magnetization of the disk medium, specifically, its magnitudes and frequency content, is within normal parameters. Following the pad 202 is a PLO field 204. The PLO field 204 includes bytes having a known pattern that facilitate clock recovery. The pattern of bytes is typically locked onto by a phase locked loop circuit in a disk controller for synchronization to the data stream from platter 100. An equalization field 206 typically follows the PLO field 204. SYNC field 208 includes a readily identifiable predetermined pattern to allow the disk controller to align to the beginning of data field 210. A second pad field 210 is included as a buffer at the end of the data field.

The disk controller obtains information regarding the locations of data sectors from a timing generator, often referred to as a servo timing generator. The servo timing generator typically provides pulses that coincide with the location of the beginning of a data sector—these are referred to as sector pulses. In a write operation, the disk controller responds to the occurrence of a sector pulse by initiating the transfer of data. A certain latency period exists before the controller can begin providing data. The latency may be due to the fact that the disk controller, or sequencer, is running off a clock that is not synchronized to the clock used to generate the sector pulses. In addition, the disk controller, sequencer, and/or associated circuitry may require one or more clock cycles to process the occurrence of a sector pulse. The latency period can cause gaps following a sector pulse, resulting in under utilization of the disk.

SUMMARY OF THE INVENTION

A device to turn on a disk formatter's write gate and NRZ line drivers with minimal delay from the beginning of a sector is provided. A preferred embodiment of the device utilizes a look-ahead scheme to qualify a sector pulse to drive the write gate and enable the NRZ output drivers. The sector pulse is generally not synchronous with the clock that drives the sequencer, which is a source of delay if the sequencer alone provides the signal to drive the write gate and enable the NRZ drivers. The write gate and NRZ line drivers are conditionally enabled by the sector pulse and are held in the enabled state until the disk formatter provides a write enable signal. In the interim period, the enabled NRZ line drivers provide binary zeros until the formatter provides actual data to the drivers.

The disk controller write-gate apparatus includes a first logic circuit configured to accept inputs indicative of the status of a disk controller and timing information. The first logic circuit provides a write enable signal. The first logic circuit is typically an AND gate, but other gate combinations may be utilized. The write enable signal is preferably generated from a sync pulse. The apparatus also includes a standard disk sequencer that provides a sequencer write gate output and a sequencer data output. The sequencer responds to the write enable signal of the first logic circuit to produce a sequencer write gate signal. The write gate signal is typically provided substantially later in time than the write enable signal. This is due to processing latency within the sequencer and associated circuitry. A second logic circuit, an OR gate in one embodiment, is connected to the first logic circuit, the sequencer data output, and the write gate output. The second logic circuit provides a predetermined data signal, typically all zeros, beginning with the occurrence of the write enable signal. Upon the occurrence of the write gate signal from the sequencer, the second logic circuit provides data from the sequencer.

The apparatus provides the write enable signal in response to one or more of the following conditions: a sector pulse signal, the values of the requested PSA and the current PSA (in particular, that the requested PSA is one greater than the current PSA), the lock status of a PSA table; the lock status of a transfer control table; the status of the sequencer, and; the status of the requested PSA. The predetermined data signal is preferably a sequence of logic zeros, but may also be another data pattern—even random data. The second logic circuit of the preferred embodiment includes a multiplexer that selectively provides either a predetermined data signal source or a sequencer data signal source in response to the write gate signal.

In another embodiment, the logic circuit of the disk controller write-gate apparatus may take advantage of timing information in the form of an advanced sector pulse, in conjunction with various conditions such as whether the PSA is the next PSA occurring on the disk and whether the requested PSA is valid. In this way, the sector pulse is still pre-qualified to start the sequencer while accommodating any delay inherent in the disk sequencer.

The method of providing data to a disk driver circuit substantially coincident with the beginning of a sector includes the steps of determining the status of a disk controller; providing a first write enable signal in response to said disk controller status; providing a second write enable signal after said first write enable signal; and providing a predetermined data signal to a disk driver circuit substantially coincident with said first write enable signal and a sequencer data signal in response to said second write enable signal.

The method of determining the status of a disk controller may include the steps of determining the values of the requested PSA and the current PSA; determining the lock status of a PSA table; determining the lock status of a transfer control table; determining the status of the sequencer, or; monitoring the sequencer program bus. Preferably, the first write enable signal is provided substantially coincident with a sector pulse.

Numerous other advantages and features of the present invention will become apparent from the following detailed description of the invention and the embodiments thereof, from the claims and from the accompanying drawings in which details of the invention are fully and completely disclosed as a part of this specification.

BRIEF DESCRIPTION OF THE DRAWINGS

FIG. 5 is a timing diagram.

DETAILED DESCRIPTION OF THE PREFERRED EMBODIMENTS

The Disk Controller

Figure 1:
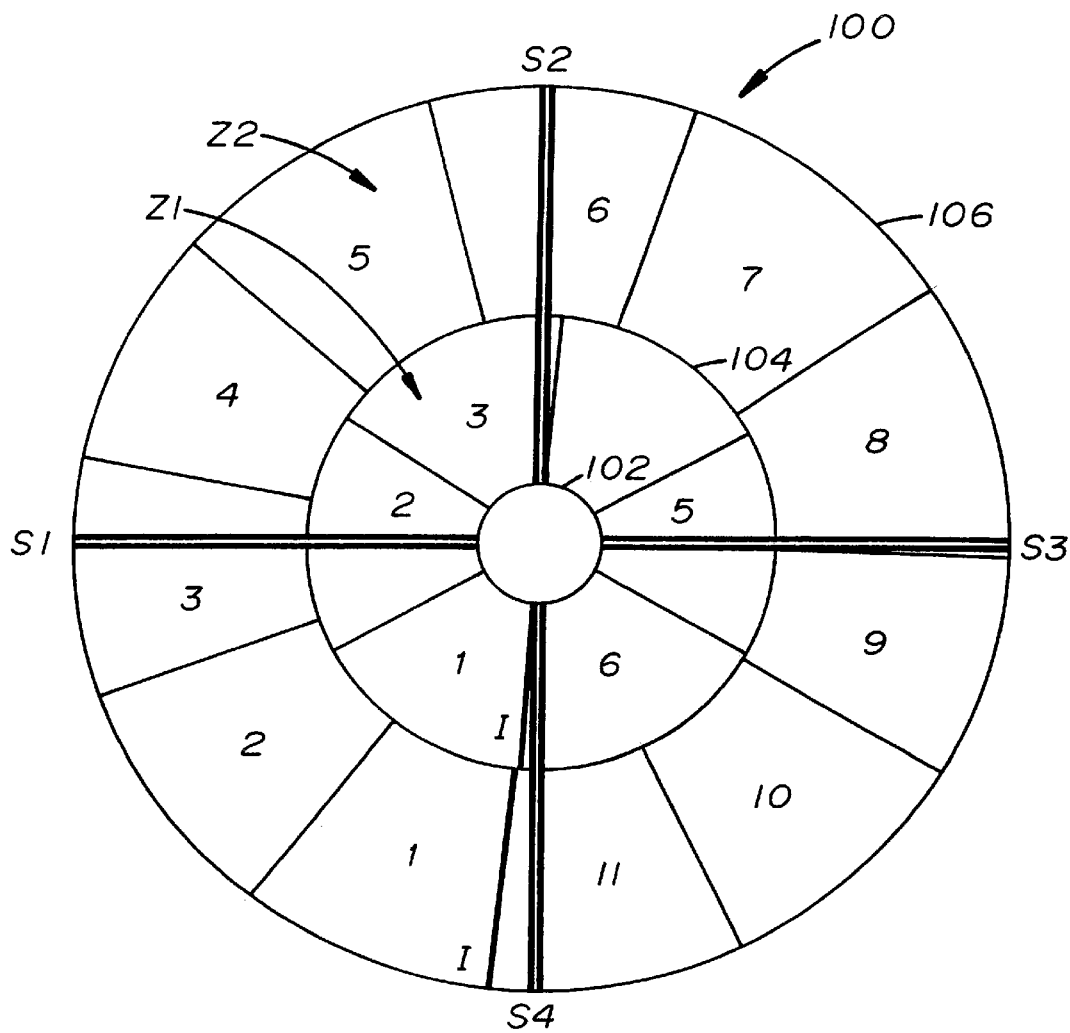
FIG. 1 is a diagram of a disk drive platter.
Figure 2:
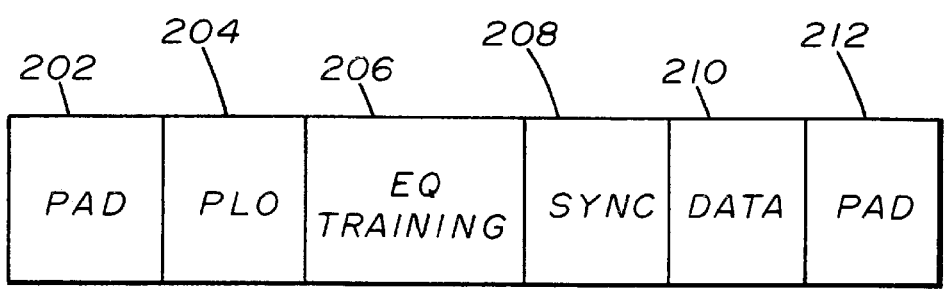
FIG. 2 illustrates the fields contained in a sector of the platter of FIG. 1.
Figure 3:
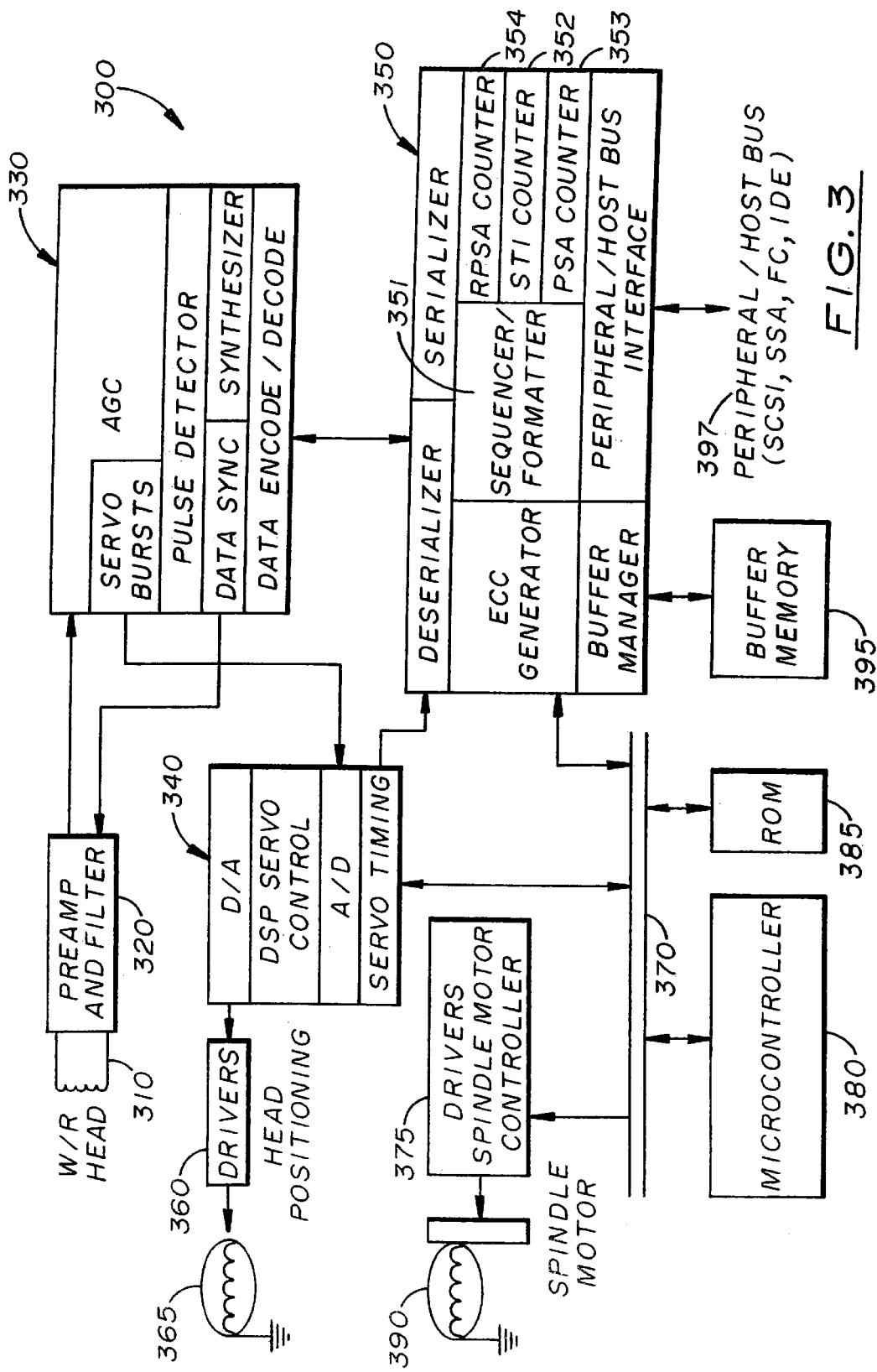
FIG. 3 is a block diagram of the disk controller.

FIG. 3 shows a disk controller 300. The disk controller 300 operates generally as follows. The disk controller keeps track of two physical sector addresses, a physical Sector Address and a Requested Physical Sector Address. The Physical Sector Address is tracked by a counter that is updated or verified at each servo field and incremented at each sector pulse produced by the servo timing generator. The Requested Physical Sector Address is the next data sector required by the host for transfer to or from the disk. To insure that each sector is transferred contiguously the Requested (or Required) Physical Sector Address is incremented by the sector pulse from the servo timing generator only if the disk formatter disk controller is in the idle state waiting for a start condition code. Therefore, if the current sector is not completely transferred by the time the next sector mark is received, the disk completes a revolution because the Physical Sector Address Counter does not match the Requested Physical Sector Address.

The components and circuits of disk controller 300 are conventional unless modified as explained below. The disk controller 300 includes a preamplifier 320, a read/write channel 330, a servo processor 340, and an integrated data controller and bus interface 350. A head 310 of disk controller 300 is coupled to the preamplifier and filter circuit 320. Preamplifier and filter circuit 320 is coupled to read/write channel 330. The read/write channel 330 is coupled to both the servo processor 340 and the integrated data controller and bus interface 350. Servo processor 340 is coupled to head positioning or actuator 365 via drivers circuit 360. Servo processor is also coupled to a bus 370.

Bus 370 is coupled to a driver and spindle motor controller 375, a micro-controller 380, a ROM 385, and integrated data controller and bus interface 350. Drivers and spindle motor controller 375 is coupled to spindle motor 390. Integrated data controller and bus interface 350 is coupled to a buffer memory 395 and is coupled to a peripheral/host bus 397.

Included in integrated data controller and bus interface 350 is a disk formatter 351. The disk formatter includes a sequencer to step through various programmed operations, such as disk read and write operations. The disk formatter 351 utilizes a high speed byte-wide data path between the disk (not shown) and buffer memory 395. Formatter 351 includes a headerless engine. To replace the functions of the header, the headerless engine uses a combination of information read from split field buffer tables in the buffer, and servo pulses. To identify the location of sectors, the headerless engine uses two types of address fields: a Physical Sector Address (PSA) and a Logical Sector Address (LSA). The PSA refers to a 10-bit physical sector address and the LSA refers to a 32-bit logical address. The LSA is the same as the small computer system interface logical block address (SCSI LBA), except when multiple physical sectors are required to make up one SCSI LBA. In this case, each SCSI LBA will be made up of multiple LSA's.

Positioning logic in formatter 351 is provided to handle sector defects and sector splits. Integrity logic in formatter 351 uses four bytes of buffer memory CRC to encode the LSA as a host-to-disk integrity check. The headerless engine does not require any change from most previous headered servo systems since the headerless engine uses a servo pulse generated by a conventional servo system. The headerless engine does not rely on firmware for real time critical functions such as updating header information on the fly.

Also, the headerless engine has checks to ensure data integrity, such as self-checking the PSAs and CRC exclusive-ORed with the LSA.

The headerless engine further provides proper flags for a sequencer in integrated data controller and bus interface 350 to control data transfers. The flags are defect, skip, and split. These flags are used by the data sequencer in the data formatter to control the data transfer. These flags are architected to be a generic protocol such that the flags could easily be provided by other logic implementations, such as a lower cost, more firmware intensive method as in low-end disk controllers or a custom solution.

The formatter includes a random access memory (RAM) (not shown) that contains the program instruction code to instruct the formatter's sequencer to carry out operations such as a read cycle or a write cycle. The formatter RAM is accessible to the microcontroller 380 over bus 370, and microcontroller 380 provides the formatter's program code by writing the instructions to the RAM.

Headerless Operation Using a Split Field Buffer Table

The disk controller navigates the disk using a split field buffer table. The table is built at system power up to contain a data structure for each zone contained on a platter. Preferably, the split field buffer table is stored on the disk and loaded into buffer memory 395 upon power up. The split field buffer table information is generated at the time of formatting the disk during disk manufacture. The split field buffer table includes information corresponding to each zone and each servo field. The entries in split field buffer table include the fields such as: Numsec, CDR, and PSA. The field Numsec represents the number of sector pulses between two sequential servo fields. The field CDR represents the sector split byte count. A CDR value of 122 means that the sector is split and that there are 122 bytes of data before the next servo pulse from servo field. Preferably, a CDR value of "0" represents that there are no sector splits. The PSA field of the split buffer table represents the physical sector address of the first full sector after the servo field.

The indexing of the entries of the split field buffer table during data transfer (i.e., reads and writes) is preferably controlled via a servo processor interface included in formatter 351. (FIG. 3) Formatter 351 receives from servo processor 340, via the servo processor interface, information about where the head is positioned over the disk before any data can be transferred. The servo interface receives an index pulse and a servo pulse from servo processor 340. A split table index counter (STI counter 352 in FIG. 3) tracks the current servo number by storing the present servo number. The index signal from servo processor 340 resets the split table index counter. The STI counter 352 is incremented for each servo wedge by the servo signal. The STI counter serves as the lower address bits used to index the entries of the split field buffer table in buffer memory 395; it is combined with an upper split table base address register that represents the zone. Since the number of servos is constant for the drive, formatter 351 will know which servo is next without needing to wait for an index pulse when seeking to a new zone.

A table entry from split field buffer table is fetched in response to each servo pulse. The servo count in split table index counter 352 is used as an index to the split field buffer table. A positional PSA counter representing the current PSA (353 in FIG. 3) is loaded at each servo gap with the PSA value in the retrieved split field buffer table entry. The RPSA counter 354 contains the value of the requested PSA. The positional PSA counter 353 increments for every sector pulse thereafter. While the sequencer is idle, the PSA counter is loaded at each servo gap. If the sequencer is not idle, then the PSA counter is verified at each servo gap. To initiate a write sequence, microcontroller 380 writes the value of the initial PSA to the requested PSA (RPSA) counter 354 in formatter 351. The RPSA counter 354 is incremented at each sector pulse.

The microprocessor preferably loads a list of PSA addresses into the buffer 395 to control the transfer. The list, also known as a transfer control table, is used to manage defects or other transfer adjustments. This list is preferably stored in a reserved segment of buffer memory 395 (FIG. 3). Each entry contains the affected PSA, a bit to signify whether the LSA should be incremented, an action, an interrupt/branch bit and, preferably, parity. The increment bit should be set for logically skipped sectors and reset for defective sectors. The interrupt/branch bit causes a preferred maskable interrupt and a branch flag typically when the last sector of a track has been read or written.

The action is preferably a "no-op", stop, single step or start and stop skips. The no-op action informs formatter 351 to take no action with the data, i.e., no data transfer. This action may apply to a default. A stop action can be used to stop in the middle of a data transfer. A single step informs formatter 351 to skip to the next PSA, whereas the start and stop skip actions cause formatter 351 to skip from start/requested PSA to an end PSA when there are multiple contiguous sectors to be skipped.

This list preferably is in the same order as the programmed transfer; that is from the first PSA to the last PSA within the programmed data transfer, including any wrapovers to zero. During the data transfer, each entry of the transfer control table will be loaded and used for comparison to the PSA to determine action. There is a separate address pointer for this transfer control buffer table. The process starts on a table pointer write and stops when the sequencer stops. The start of the table is loaded first, and each subsequent entry is loaded as the current entry is used. This provides for a "look ahead" scheme in that it is known before arriving at a pre-determined sector what action should be taken. There is no ceiling to the list and the address pointer will increment to load entries until the sequencer stops. Note that a no-op entry preferably is added after the last valid entry since an additional entry will be fetched after the last one is used. Setting the first or last table entry as a no-op at the end, for example, is useful since the sequencer would stop before the start/requested PSA counter would rotate back around. A no-op entry is also preferred when no defects are present on the target track. In this case, to ensure no PSA match occurs, an illegal PSA value (a number beyond the available number on the track) should be used.

The Write Gate Look-Ahead Device

The circuit provides a look-ahead function, thereby enabling the sequencer portion of the formatter to begin writing data as soon as possible after the beginning of a sector. The circuit identifies whether the requested PSA is the next PSA on the disk, and responsively provides advance timing under those conditions so that data is provided to the write heads with minimal delay.

Figure 4:
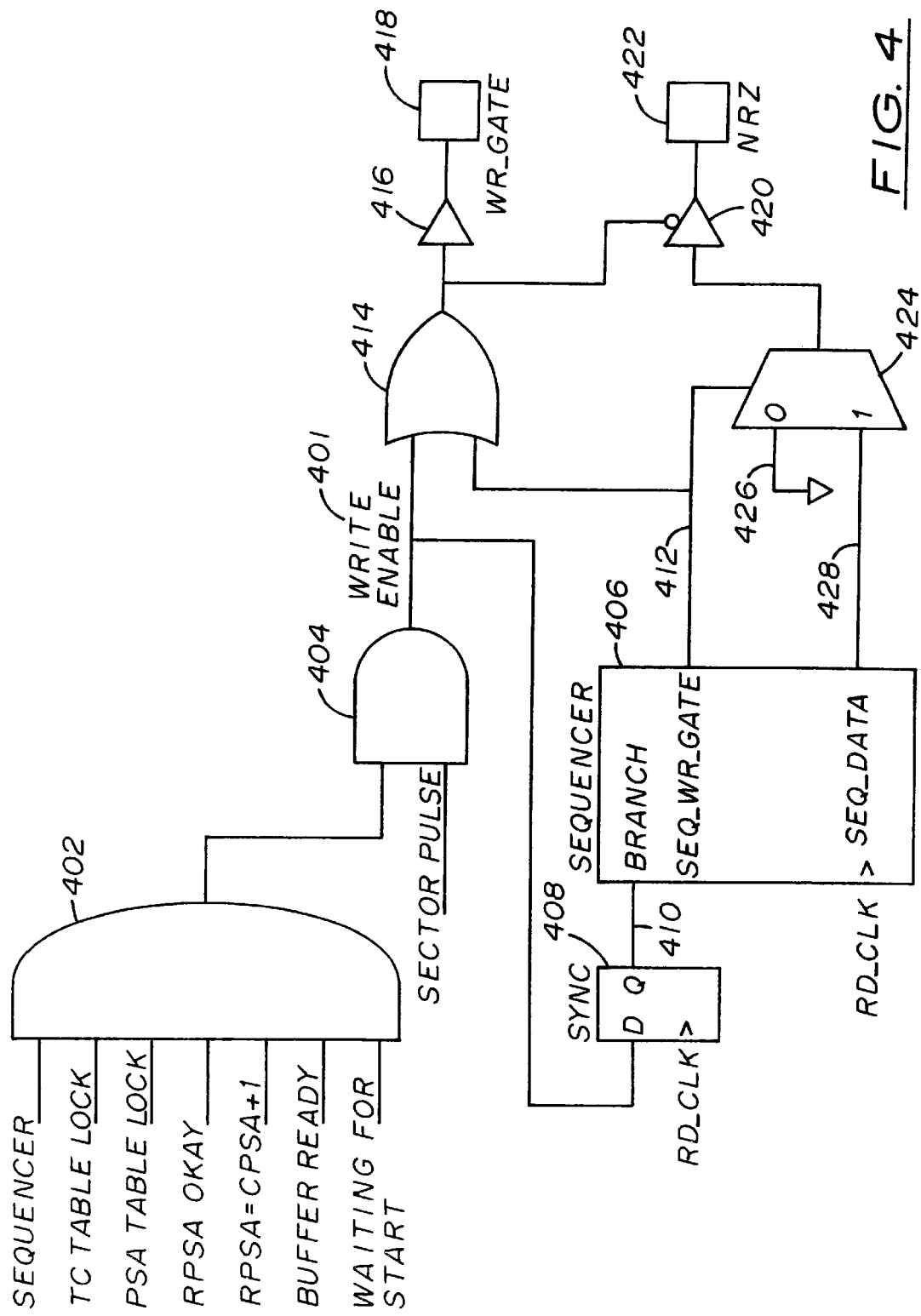
FIG. 4 is circuit diagram of the look-ahead write gate circuit.

One preferred embodiment of the write-gate look-ahead device 400 is depicted in FIG. 4. Logic gate 402 is an AND gate that provides a logic one output when all of the input conditions are satisfied. This output is used to qualify a sector pulse in AND gate 404. One of skill in the area of logic circuit design will understand that the gates 402 and 404 may be combined into a single logic function that may be realized in any number of logic gate configurations. The qualified sector pulse from gate 404 is a write enable signal 401 provided to the logic gate 414, which is an OR gate. The write enable signal passes through OR gate 414 and tristate buffer 416 and becomes a write gate signal. The write gate signal is provided to the disk controller circuitry via the WR_GATE line 418.

The write enable signal 401, or qualified sector pulse, is also provided to sequencer 406 by way of SYNC circuit 408. SYNC circuit 408 is preferably two interconnected flip-flops. The SYNC circuit synchronizes the qualified sector pulse to the read clock (RD_CLK), and ensures that the write enable signal is stable before providing it to sequencer 406. In response to the qualified and synchronized sector pulse on the BANCH input 410, sequencer 406 provides a sequencer write gate signal on the output SEQ_WR_GATE 412. The sequencer write gate signal passes through OR gate 414 and tristate buffer 416 to generate a write gate signal. It is provided to the disk controller circuitry via the WR_GATE line 418.

Multiplexer 424 provides the data to the write heads by way of tristate buffer 420 and NRZ line 422. Multiplexer 424 provides either predetermined data from line 426, shown as a repeating logic zero pattern, or from line 428, which is the sequencer data source labeled SEQ_DATA. Alternatively, the predetermined data on line 426 may be alternating ones and zeros, a specific pattern of ones and zeros, a psuedo random sequence or a truly random sequence. The data source selected for the output of multiplexer 424 is determined by the state of the sequencer write gate signal on line 412. The predetermined pattern is selected and provided to the buffer 420 when the sequencer write gate signal is a logic low, or false, and the sequencer data source on line 428 is selected and provided to the buffer 420 when the sequencer write gate signal is present, or true. Note that the buffer 420 is enabled only if a write gate signal is present. Thus, either a write enable signal (a qualified sector pulse), or the sequencer write gate signal must be present to enable the buffer 420 by way of OR gate 414.

The sector pulse is used to generate a write gate signal in advance of the sequencer write gate signal only if various look-ahead conditions are properly met. These conditions are shown as the inputs to the AND gate 402. The inputs are preferably supplied by components such as a register or flip-flops that are set to a true value or reset to a false value to indicate the current status of various corresponding conditions. The first input, labeled SEQUENCER, is true if the sequencer has been enabled. This is a general status indication that the sequencer is in its operative mode. The second input, labeled TC TABLE LOCK, is set once the transfer control table has been locked, or synchronized. The third input, labeled PSA TABLE LOCK, is set if the PSA table has been locked, or synchronized. The fourth input, labeled RPSA OKAY, is set if the requested PSA is not defective or tagged to be skipped. The fifth input, labeled RPSA=CPSA+1, is set if the requested PSA is the next PSA on the disk, which is true if the RPSA is one greater than the current PSA, CPSA. The sixth input, labeled BUFFER READY, is set if the buffer memory 395 is ready to be accessed by the sequencer. The buffer 395 contains the data to be transferred by the sequencer, and the sequencer must successfully arbitrate for bus control in order to retrieve data from the buffer memory 395. The seventh and final input, labeled WAITING FOR START, is set if the sequencer is idle, and waiting for a start instruction. This input is preferably determined by analyzing the instructions on the program bus. Specifically, the sequencer program is in an infinite loop while awaiting the occurrence of a start pulse. A series of logic gates are used to decode a portion of the instruction on the program bus to identify the loop condition. If the sequencer is still processing the previous transfer, the look-ahead is disabled. An additional component of the WAITING FOR START signal is an indication that the formatter is in the write mode. This may be provided by the microcontroller setting a flag in the buffer or in a separate register within the formatter. This condition allows the write gate signal to be present only when writing data to the disk.

The start/requested PSA register command to the sequencer loads the RPSA counter 354 with the requested PSA and indicates the beginning of the transfer. After the sequencer portion of the formatter 351 is started, at each sector pulse a start flag will be generated and provided to the sequencer if various conditions are met. During a write operation, the sequencer begins by receiving a branch instruction providing a write gate enable signal indicating that a write operation is beginning, and provides the data to be stored as non-return to zero (NRZ) pulses that are magnetically encoded onto the disk.

The signals depicted in FIG. 5 demonstrate the advantages of the write gate look-ahead device. Signal 500 is the servo clock. This clock is generated from the servo unit 340 that obtains its timing source from a free-running oscillator. Signal 502 is the sector pulse derived from the servo clock. The sector pulse is generated in the following manner: when a servo field is read, the contents include a specific code, generally referred to as an illegal code. This indicates to the servo timing generator that its sector pulse counters should be reset with a value specifying a delay until the next sector pulse should be generated. The values loaded into the sector pulse counters are obtained either from a table look up or from a calculation based on the zone and the servo that is being processed. The sector pulse counters are under the control of either the microprocessor or a second sequencer that is integral to the servo timing controller.

Signal 504 is the write enable signal from AND gate 504. It is a qualified sector pulse. Signal 506 shows the BRANCH signal. The BRANCH signal is a qualified sector pulse after having been synced to the read clock 506 (which is a clock signal derived from data read from the disk) and processed by SYNC circuit 408. Notice the delay imposed by the SYNC circuit 408. The sequencer then processes the BRANCH signal and provides a sequencer write gate signal SEQ_WR_GATE 510. The sequencer also provides data 512 contemporaneously with the sequencer write gate signal 510. The current PSA is updated as shown by current PSA signal 514.

The sector pulse 502 causes the write enable signal 504 and the write gate signal 516 to be true. The write enable signal 504 keeps the write gate signal high until the sequencer write gate signal 510 is able to contribute a true value. When the write enalbe signal initially goes high, the multiplexer 424 provides predetermined data from source 426. Predetermined data is provided in the interim period until the sequencer is able to provide the sequencer write gate signal, causing the multiplexer 424 to select sequencer data 512 on line 428.

In an alternative embodiment of the write gate look ahead device, the sector pulse counters of the servo timing generator may be modified to cause an early sector pulse. The early sector pulse is still conditioned by the inputs to AND gate 402 to ensure, among other things, that the next PSA is valid. The qualified sector pulse may then be processed normally, without the need for gate 414 and multiplexer 424. The write gate signal would be provided exclusively by the sequencer write gate signal. Of course, the sequencer data source would then have to provide the predetermined data portion of the data to be written to NRZ line 422.

While the invention has been described in conjunction with presently preferred embodiments of the invention, persons of skill in the art will appreciate that variations may be made without departure from the scope and spirit of the invention. This true scope and spirit is defined by the appended claims, as interpreted in light of the foregoing.

I claim:

1. A disk controller write-gate apparatus comprising:

a first logic circuit configured to accept inputs indicative of the status of a disk controller and timing information, said first logic circuit providing a write enable signal;

a disk sequencer having a sequencer write gate output and a sequencer data output, said sequencer providing a sequencer write gate signal at said write gate output in response to said write enable signal, wherein said write gate signal is provided later in time than said write enable signal; and, a second logic circuit connected to said first logic circuit, said sequencer data output, and said write gate output, wherein said second logic circuit provides a predetermined data signal in response to said write enable signal and provides a sequencer data signal from said sequencer data output in response to said write gate signal, and wherein the predetermined data signal and the sequencer data signal are provided in response to a servo input received from a disk based upon a predicted position of a disk drive head of the disk without synchronizing the servo input to a reference clock such that the predetermined data signal and the sequencer data signal are provided in a minimal time after receiving the servo input.

2. The apparatus of claim 1 wherein said first logic circuit conditionally provides a write enable signal in response to a sector pulse signal.

3. The apparatus of claim 2 wherein said write enable signal from said first logic circuit is conditioned on the values of the requested PSA and the current PSA.

4. The apparatus of claim 2 wherein said write enable signal from said first logic circuit is conditioned on the lock status of a PSA table.

5. The apparatus of claim 2 wherein said write enable signal from said first logic circuit is conditioned on the lock status of a transfer control table.

6. The apparatus of claim 2 wherein said write enable signal from said first logic circuit is conditioned on the status of said sequencer.

7. The apparatus of claim 2 wherein said write enable signal from said first logic circuit is conditioned on the status of the requested PSA.

8. The apparatus of claim 1 wherein said predetermined data signal is a sequence of logic zeros.

9. The apparatus of claim 1 wherein said first logic circuit is an AND gate.

10. The apparatus of claim 1 wherein said second logic circuit comprises an OR gate.

11. The apparatus of claim 1 wherein said second logic circuit further comprises a multiplexer having an output, wherein said multiplexer output selectively provides a signal selected from a predetermined data signal and a sequencer data signal in response to said write gate signal.

12. A disk controller write-gate apparatus comprising:

a logic circuit configured to accept inputs indicative of the status of a disk controller, said status information including whether the requested PSA is the next PSA occurring on the disk and whether the requested PSA is valid, said logic signal also configured to accept a timing information, wherein said timing information precedes the occurrence of the beginning of a sector, said logic circuit providing a write enable signal;

a disk sequencer having a sequencer write gate output and a sequencer data output, said sequencer providing a sequencer write gate signal at said write gate output in response to said write enable signal;

wherein said logic circuit conditionally provides an advanced write enable signal that accommodates an inherent delay in said sequencer, and wherein the advanced write enable signal and the sequencer write gate signal are provided in response to a servo input received from a disk based upon a predicted position of a disk drive head of the disk without synchronizing the servo input to a reference clock such that the advanced write enable signal and the sequencer write gate signal are provided in a minimal time after receiving the servo input.

13. A method of providing data to a disk driver circuit substantially coincident with the beginning of a sector, comprising the steps of:

determining the status of a disk controller;

providing a first write enable signal in response to said disk controller status;

providing a second write enable signal after said first write enable signal; and providing a predetermined data signal to a disk driver circuit substantially coincident with the first write enable signal and a sequencer data signal in response to said second write enable signal, such that the predetermined data signal and the sequencer data signal are provided in response to a servo input received from a disk based upon a predicted position of a disk drive head of the disk without synchronizing the servo input to a reference clock such that the predetermined data signal and the sequencer data signal are provided in a minimal time after receiving the servo input.

14. The method of claim 13 wherein the step of determining the status of a disk controller includes the step of determining the values of the requested PSA and the current PSA.

15. The method of claim 13 wherein the step of determining the status of a disk controller includes the step of determining the lock status of a PSA table.

16. The method of claim 13 wherein the step of determining the status of a disk controller includes the step of determining the lock status of a transfer control table.

17. The method of claim 13 wherein the step of determining the status of a disk controller includes the step of determining the status of a sequencer.

18. The method of claim 17 wherein the step of determining the status of a sequencer includes monitoring a sequencer program bus.

19. The method of claim 13 wherein said first write enable signal is substantially coincident with a sector pulse.

20. The method of claim 13 wherein the step of providing a predetermined data signal to a disk driver circuit substantially coincident with said first write enable signal and a sequencer data signal in response to said second write enable signal is performed using a multiplexer.

\* \* \* \* \*